United States Patent
Kweon

(10) Patent No.: US 8,314,974 B2
(45) Date of Patent: Nov. 20, 2012

(54) APPARATUS AND METHOD OF DUAL SIDED IMAGE READING

(75) Inventor: Do Hyung Kweon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1231 days.

(21) Appl. No.: 12/107,925

(22) Filed: Apr. 23, 2008

(65) Prior Publication Data

US 2009/0027745 A1     Jan. 29, 2009

(30) Foreign Application Priority Data

Jul. 24, 2007  (KR) .......................... 10-2007-0074163

(51) Int. Cl.
*H04N 1/04*    (2006.01)
(52) U.S. Cl. ........................................ 358/474; 358/498
(58) Field of Classification Search .................. 358/474, 358/498, 1.1, 1.5
See application file for complete search history.

(56) References Cited

U.S. PATENT DOCUMENTS 7,884,975 B2 *   2/2011   Uku .............................. 358/474

FOREIGN PATENT DOCUMENTS

| | | |
|---|---|---|
| CN | 1471039 | 1/2004 |
| JP | 2005-072760 | 3/2002 |
| JP | 2002-112015 | 4/2002 |
| JP | 2004-040311 | 2/2004 |
| JP | 2005-072760 | 3/2005 |
| JP | 2005-295359 | 10/2005 |
| KR | 2006-53488 | 5/2006 |

OTHER PUBLICATIONS

Chinese Office Action issued Feb. 5, 2010 in CN Application No. 200810107804.6.
Japanese Office Action Issued on Jun. 26, 2012 in JP Patent Application No. 2008-142441.

* cited by examiner

*Primary Examiner* — Douglas Tran
(74) *Attorney, Agent, or Firm* — Stanzione & Kim, LLP

(57) ABSTRACT

An image reading apparatus to prevent reading quality from deteriorating when two reading units respectively read a first side and a second side of a document with different capabilities, and a method of controlling the same includes an automatic document feeder to feed a document, a first reading unit to read a first side of the document fed by the automatic document feeder, and a second reading unit to read a second side of the document fed by the automatic document feeder. A control unit to control an operation of the image reading apparatus determines at least one of the first reading unit and the second reading unit as a reference reading unit in a both-side reading mode in which both sides of the document are read and controls a transport speed of the document such that the document is transported at a speed to allow the reference reading unit to read the document.

11 Claims, 4 Drawing Sheets

APPARATUS AND METHOD OF DUAL SIDED IMAGE READING

CROSS-REFERENCE TO RELATED APPLICATIONS

This application claims priority under 35 U.S.C. §119(a) from Korean Patent Application No. 2007-74163, filed on Jul. 24, 2007 in the Korean Intellectual Property Office, the disclosure of which is incorporated herein in its entirety by reference.

BACKGROUND OF THE INVENTION

1. Field of the Invention

The present general inventive concept relates to an image reading apparatus, and, more particularly, to an image reading apparatus to read image information recorded on a first side and a second side of a document with different capabilities and a method of controlling the same.

2. Description of the Related Art

An image reading apparatus reads image information recorded on a document and is mounted in a machine such as a scanner, a digital copier or a multi-function machine.

A method of reading both sides of a document in an image reading apparatus may be classified into two methods. There is a method of reading a first side of a transported document via a reading unit, changing a transport direction of the document via a document direction changing device, reversing the first side and a second side of the document via a duplex path, and reading the second side of the document. Such a method is advantageous in that the both sides of the document can be read using one reading unit, but is disadvantageous in an amount of time required to read the both sides of the document.

There is also a method of reading both sides of a document by mounting a first reading unit to read a first side of the document and a second reading unit to read a second side of the document to be opposed to each other. Such a method is advantageous in that the both sides of the document can be simultaneously read without unnecessarily circulating the document and thus a both-side reading operation can be performed with a high speed.

When both sides of a document are read using an image reading apparatus employing the latter method, a user may want to read a first side and a second side of the document with different capabilities as needed. For example, when a document having a first side on which a picture or a drawing is recorded and a second side on which only characters are recorded is read, the user may want to read the first side with a high resolution and read the second side with a low resolution. In addition, the user may want to read the first side of the document in full-color and to read the second side of the document in monochrome.

However, if the document is read without considering the reading options which are respectively selected by the user with respect to the two reading units are different from each other, at least one of the two reading units cannot sufficiently perform a function thereof and thus reading quality deteriorates.

SUMMARY OF THE INVENTION

The present general inventive concept provides an image reading apparatus to prevent reading quality from deteriorating when two reading units respectively read a first side and a second side of a document with different capabilities, and a method of controlling the same.

Additional aspects and utilities of the present general inventive concept will be set forth in part in the description which follows and, in part, will be obvious from the description, or may be learned by practice of the general inventive concept.

The foregoing and/or other aspects and utilities of the general inventive concept may be achieved by providing an image reading apparatus including an automatic document feeder to feed a document, a first reading unit to read a first side of the document fed by the automatic document feeder, a second reading unit to read a second side of the document fed by the automatic document feeder, and a control unit to determine at least one of the first reading unit and the second reading unit as a reference reading unit in a both-side reading mode in which both sides of the document are read and control a transport speed of the document such that the document is transported at a speed to allow the reference reading unit to read the document.

The control unit may estimate a time necessary for the first reading unit to read image information of the document with a time necessary for the second reading unit to read image information of the document and determine at least one of the first and second reading units, which has a longer time, as the reference reading unit.

The control unit may estimate a time necessary to store image data read by the first reading unit with a time necessary to store image data read by the second reading unit and determine at least one of the first and second reading units, which has a longer time, as the reference reading unit.

The control unit may compare a reading resolution of the first reading unit with a reading resolution of the second reading unit and determine at least one of the first and second reading units, which has a higher reading resolution, as the reference reading unit.

The control unit may control the first reading unit or the second reading unit such that a time interval in which at least one of the first and second reading units, which is not the reference reading unit, reads image information from the document is increased.

The foregoing and/or other aspects and utilities of the general inventive concept may also be achieved by providing an image reading apparatus including: first and second reading units to respectively read a first side and a second side of a document with different capabilities, and an automatic document feeder to feed the document at a speed to allow at least one of the first and second reading units, which has a higher reading resolution, to read the document.

The foregoing and/or other aspects and utilities of the general inventive concept may also be achieved by providing a method of controlling an image reading apparatus including first and second reading units to respectively read a first side and a second side of a transported document, the method including: determining at least one of the first reading unit and the second reading unit as a reference reading unit in a both-side reading mode in which both sides of the document are read, and controlling a transport speed of the document such that the document is transported at a speed to allow the reference reading unit to read the document.

The determining of the reference reading unit may include estimating a time necessary for the first reading unit to read the document with a time necessary for the second reading unit to read the document according to a reading option selected by a user and determining at least one of the first and second reading units, which has a longer time, as the reference reading unit.

The determining of the reference reading unit may include comparing a reading resolution of the first reading unit with a reading resolution of the second reading unit and determining at least one of the first and second reading units, which has a higher reading resolution, as the reference reading unit.

The foregoing and/or other aspects and utilities of the general inventive concept may also be achieved by providing an image forming apparatus including a first reading unit to read one side of the document, a second reading unit to read an other second side of the document, an input unit to provide first reading options corresponding to a first reading unit and second reading options corresponding to a second reading unit from which a user can select, and a control unit to selectively control the first reading unit and the second reading unit based on the respective first and second reading options selected by the user.

The respective option selected by the user for each of the first reading unit and the second reading unit are different from each other.

The first and second reading options include a color capability, a monochrome capability and resolution capabilities.

The control may selectively control a transport speed of the document to the first reading unit and the second reading unit based on the respective first reading options and second reading options selected by the user.

The foregoing and/or other aspects and utilities of the general inventive concept may also be achieved by providing an image forming apparatus including providing first reading options corresponding to a first reading unit and second reading options corresponding to a second reading unit from which a user can select, and selectively controlling the first reading unit and the second reading unit based on the respective first and second reading options selected by the user.

The foregoing and/or other aspects and utilities of the general inventive concept may also be achieved by providing a computer-readable recording medium having embodied thereon a computer program to execute a method, wherein the method includes providing first reading options corresponding to a first reading unit and second reading options corresponding to a second reading unit from which a user can select, and selectively controlling the first reading unit and the second reading unit based on the respective first and second reading options selected by the user.

BRIEF DESCRIPTION OF THE DRAWINGS

These and/or other aspects and utilities of the present inventive concept will become apparent and more readily appreciated from the following description of the embodiments, taken in conjunction with the accompanying drawings of which.

DETAILED DESCRIPTION OF THE PREFERRED EMBODIMENTS

Figure 1:
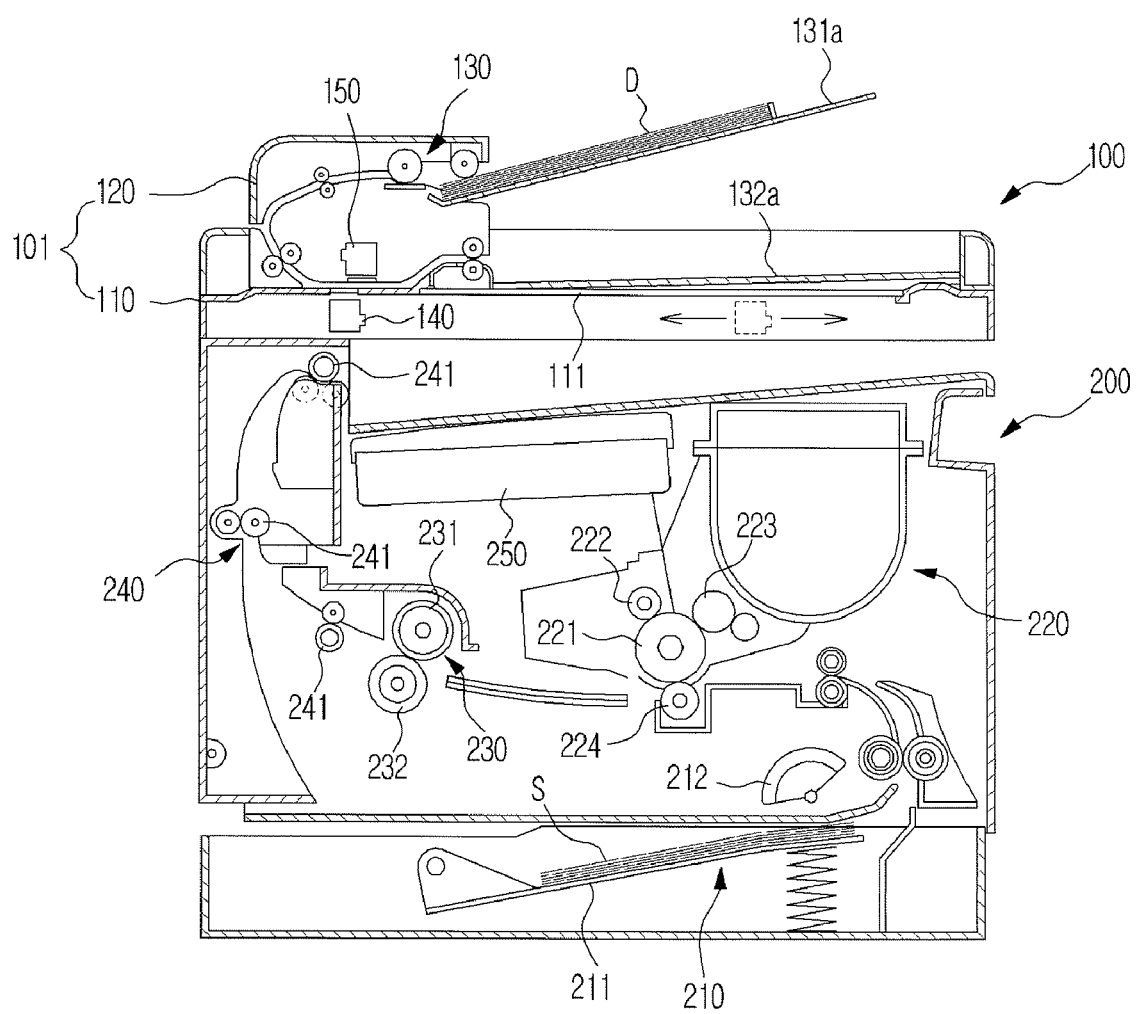
FIG. 1 is a view illustrating a configuration of a multi-function machine having an image reading apparatus according to an embodiment of the present general inventive concept.

Reference will now be made in detail to embodiments of the present general inventive concept, examples of which are illustrated in the accompanying drawings, wherein like reference numerals refer to the like elements throughout. The embodiments are described below in order to explain the present general inventive concept by referring to the figures.

Figure 2:
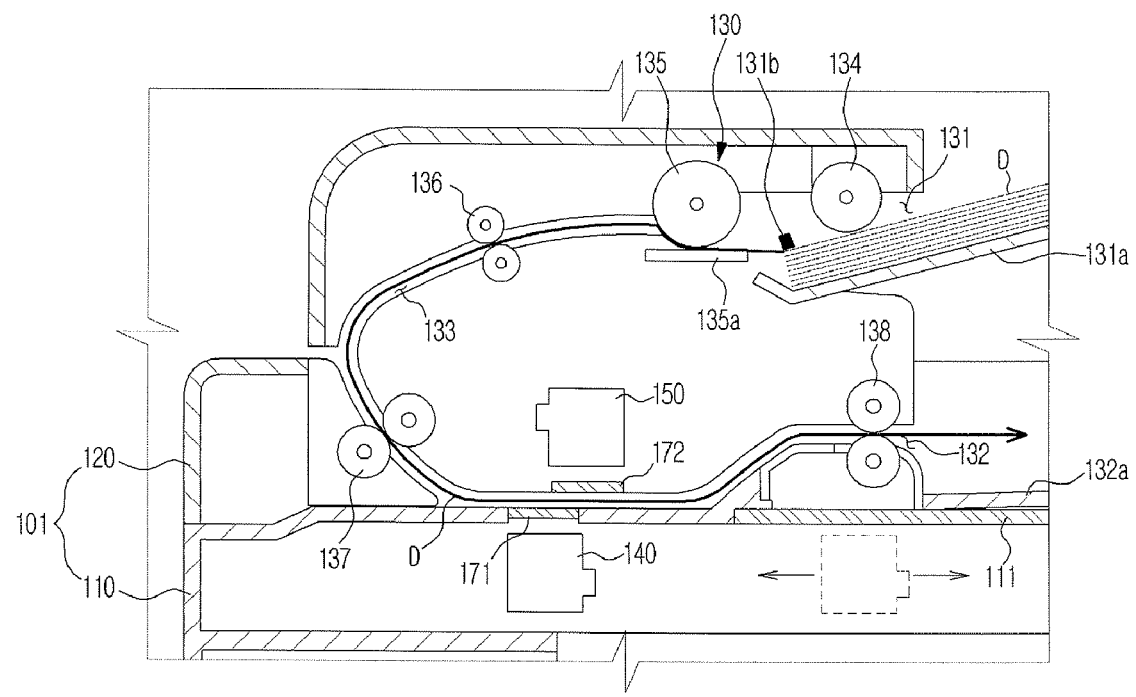
FIG. 2 is a view illustrating a configuration of the image reading apparatus according to an embodiment of the present general inventive concept.
Figure 3:
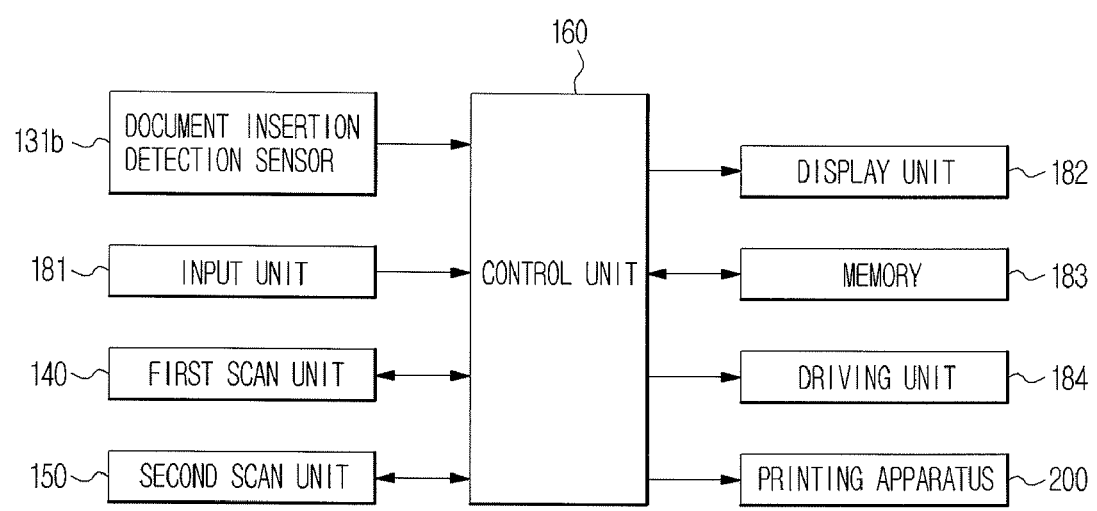
FIG. 3 is a block diagram illustrating the image reading apparatus according to an embodiment of the present general inventive concept.

FIG. 1 is a view illustrating a configuration of a multi-function machine having an image reading apparatus according to an embodiment of the present general inventive concept, FIG. 2 is a view illustrating a configuration of the image reading apparatus according to an embodiment of the present general inventive concept, and FIG. 3 is a block diagram illustrating the image reading apparatus according to an embodiment of the present general inventive concept.

As illustrated in FIG. 1, the multi-function machine includes an image reading apparatus 100 to read an image recorded on a document and a printing apparatus 200 to print an image on a document.

The printing apparatus 200 prints an image according to a signal input from the image reading apparatus 100 or input from an external apparatus such as a personal computer (PC). The printing apparatus 200 includes a document feed unit 210 to feed a document S which is a printing medium, a development unit 220 to develop an image on the document, a fixing unit 230 to apply heat and pressure to the document and fix the developed image to the document, and an ejection unit 240 to eject the document on which the image is printed.

The document S loaded on a document tray 211 is picked up by a pickup roller 212 and is transported to the development unit 220. An electrostatic latent image is formed on the surface of a photosensitive drum 221, which is charged with a predetermined potential by a charging roller 222, by an exposure unit 250. The electrostatic latent image is developed to a toner image by a development roller 223 and is transferred onto a document by a transfer roller 224. The toner image transferred onto the document is fixed to the document by heat and pressure when passing between a heating roller 231 and a pressurization roller 232 of the fixing unit 230, and the document passing through the fixing unit 230 is transported and ejected by an ejection roller 241.

As illustrated in FIGS. 2 and 3, the image reading apparatus 100 according to embodiments of the present general inventive concept includes a reading apparatus main body 101 including a reading frame 110 and a cover 120, an automatic document feeder (ADF) 130 to automatically feed a document such that a reading operation can be continuously performed, first and second reading units 140 and 150 to irradiate light onto a document D and read image information, and a control unit 160 to control an entire operation of the image reading apparatus 100 according to an input signal of a user and a predetermined program.

The first reading unit 140 and the second reading unit 150 irradiate light onto the document D, detect light reflected from the document, convert the amount of light into an electrical signal, and send the electrical signal to the control unit 160. The first reading unit 140 and the second reading unit 150 face each other with a document transporting path 133 interposed therebetween. More particularly, the first reading unit 140 is located below the document D fed by the automatic document feeder 130 to read image information from a first side of the document, and the second reading unit 150 is located above the document D fed by the automatic document feeder 130 to read image information from a second side of the document.

The first reading unit 140 and the second reading unit 150 are respectively configured so as to read the first side and the second side of the document with different capabilities. For example, a reading unit, which can support a resolution of 1200 dpi as a maximum in consideration of a case where a high-resolution reading operation is necessary, that is, a case where a picture is read, may be used as the first reading unit 140 and a reading unit which can support a resolution of 600 dpi may be used as the second reading unit 150. A reading unit which can perform both a monochromic reading operation and a full-color reading operation may be used as the first reading unit 140 and a reading unit which can perform only the monochromic reading operation may be used as the second reading unit 150. Although the first reading unit 140 and the second reading unit 150 have the same specification, the first reading unit 140 and the second reading unit 150 can respectively read both sides of a document with different capabilities if a user selects different reading options with respect to the first reading unit 140 and the second reading unit 150.

The cover 120 is rotatably coupled to the reading frame 110 so as to open and close the upper surface of the reading frame 110. The second reading unit 150 and the automatic document feeder 130 are mounted inside the cover 120.

The first reading unit 140 is mounted inside the reading frame 110, and a flat glass 111 and a first ADF glass 171 are mounted on the upper surface of the reading frame 110. The user can lay the documents on the flat glass 111 one by one in order to read the documents. The first reading unit 140 is moved along and below the flat glass 111 to read the document laid on the flat glass 111, and is located below the first ADF glass 171 to read the first side of the document D transported by the automatic document feeder 130.

The automatic document feeder 130 includes a document insertion port 131 through which a document to be read is inserted, a document ejection port 132 through which the read document is ejected, the document transporting path 133 which is formed inside the cover 120 so as to transport the document, and rollers 135,136 and 137 which are mounted on the document transporting path 133 so as to transport the document.

The document insertion port 131 is formed at one side of the cover 120 and the document ejection port 132 is formed below the document insertion port 131. A document feed tray 131a on which the documents D to be transported by the automatic document feeder 130 are loaded and a document insertion detection sensor 131b to detect whether a document is inserted and outputs the detected result to the control unit 160 are provided in the vicinity of the document insertion port 131. A document ejection tray 132a, on which the documents ejected after the reading operation is completed are loaded, is provided in a vicinity of the document ejection port 132.

The document transporting path 133 has a C-shape. One end of the document transporting path 133 is connected to the document feed tray 131a via the document insertion port 131 and the other end thereof is connected to the document ejection tray 132a via the document ejection port 132. The first ADF glass 171 and a second ADF glass 172 are sequentially arranged on the reading path 133a such that the first reading unit 140 and the second reading unit 150 can read the image information recorded on the document D passing through the document transporting path 133. The first ADF glass 171 is mounted on the reading frame 110 at a position corresponding to the first reading unit 140 and the second ADF glass 172 is mounted on the cover 120 at a position corresponding to the second reading unit 150.

The document transporting rollers include a document pickup roller 134 to pick up the document D loaded on the document feed tray 131a, first to third transporting rollers 135, 136 and 137 to transport the document picked up by the document pickup roller 134 on the document transporting path 133, an ejection roller 138 to eject the read document to the document ejection tray 132a. The rollers 134, 135, 136, 137 and 138 are driven and rotated by at least one motor (not illustrated) and transport the document at a speed suitable to allow the first reading unit 140 and the second reading unit 150 to read the document. The first transporting roller 135, which is provided closest to the document pickup roller 134, separates the documents picked up by the document pickup roller 134 one by one. In order to separate the documents, a friction pad 135a is provided so as to be opposed to the first transporting roller 135.

The control unit 160 determines any one of the first reading unit 140 and the second reading unit 150 as a reference reading unit in a both-side reading mode in which both sides of a document are read and controls a driving unit 184 (see FIG. 3) such that the document can be transported at a speed suitable to allow the reference reading unit to read the document.

The control unit 160 may estimate reading times of the first reading unit 140 and the second reading unit 150 according to the reading option selected by the user. The control unit 160 may also determine any one of the two reading units, which has a longer reading time, as the reference reading unit. Here, the reading time indicates a time necessary to read image information recorded on a document having a predetermined size with a predetermined capability and to store the image information in a memory 183 (see FIG. 3). That is, the reading time is determined in consideration of a time necessary for a reading unit to read image information of a document and a time necessary to store the read image information in the memory 183. The control unit 160 can calculate an estimated reading time on a basis of a size of the document, the reading option selected by the user, and the specification of the reading unit.

For example, if the user sets a resolution of the first reading unit 140 to 600 dpi and sets a resolution of the second reading unit 150 to 100 dpi, the control unit 160 can calculate and compare the reading time of the first reading unit 140 and the estimated reading time of the second reading unit 150 in consideration of specifications of the first reading unit 140 and the second reading unit 150 and the resolutions set by the user. In this case, the first reading unit 140 having a high resolution is determined to the reference reading unit, and the control unit 160 controls a transporting speed of the document on a basis of the reading time of the first reading unit 140. At this time, if the document is transported at a low speed according to the reading time of the first reading unit 140, the second reading unit 150 to read the document with a low resolution reads the document more densely than is necessary. Accordingly, the control unit 160 can control the second reading unit 150 such that a reading time interval of the second reading unit 150 is increased. Here, the reading time interval indicates a time interval until a reading unit reads image information from a document a second time after the reading unit reads the image information from the document once.

Although an example where the first reading unit 140 and the second reading unit 150 read a document with different resolutions was described, the control unit 160 may estimate the reading times of the first reading unit 140 and the second reading unit 150 and control the transporting speed of the document even when the user sets the reading options of the first reading unit 140 and the second reading unit 150, such as full-color/monochrome, to be different from each other or even when the user sets the reading options such as full-color/monochrome and reading resolutions to be different from each other.

As illustrated in FIG. 3, the image reading apparatus 100 according to an embodiment of the present general inventive concept includes an input unit 181, a display unit 182, the memory 183, and the driving unit 184.

The input unit 181 inputs information on an operation of the image reading apparatus selected by the user to the control unit 160. The user can select a reading mode such as a one-side reading operation or a both-side reading operation using the input unit 181 and select which of the first reading unit 140 and the second reading unit 150 is used in the one-side reading mode. In addition, the user can select and input the reading options (reading resolution, monochrome/full-color or the like) of the first reading unit 140 and the second reading unit 150 using the input unit 181.

The display unit 182 displays an operation state of the image reading apparatus 100 to the user. The control unit 160 can display information on a direction of a side to be read via the display unit 182 in the one-side reading mode. The information on the direction of the side to be read indicates information indicating whether the side to be read is directed upward or downward when the document is laid on the document feed tray 131a.

The memory 183 stores a variety of data necessary to control the image reading apparatus. More particularly, the memory 183 stores data necessary to estimate the reading times of the first reading unit 140 and the second reading unit 150. That is, the memory 183 stores data related to a reading time determined according to the size of a document to be read, data related to a reading time determined according to a reading resolution, or data related to a reading time determined according to a monochromic/full-color reading operation.

A buffer memory (not illustrated) may be provided in the memory 183. The buffer memory temporarily stores image data read by the first reading unit 140 and the second reading unit 150. The control unit 160 can read the image data stored in the buffer memory and perform predetermined image processing (e.g., gamma correction or shading correction).

The driving unit 184 includes at least one motor to drive the rollers 134, 135, 136, 137 and 138 provided in the automatic document feeder 130. The driving unit 184 drives the motor under the control of the control unit 160, rotates the rollers 134, 135, 136, 137 and 138, and transports the document on the document transporting path 133.

Figure 4:
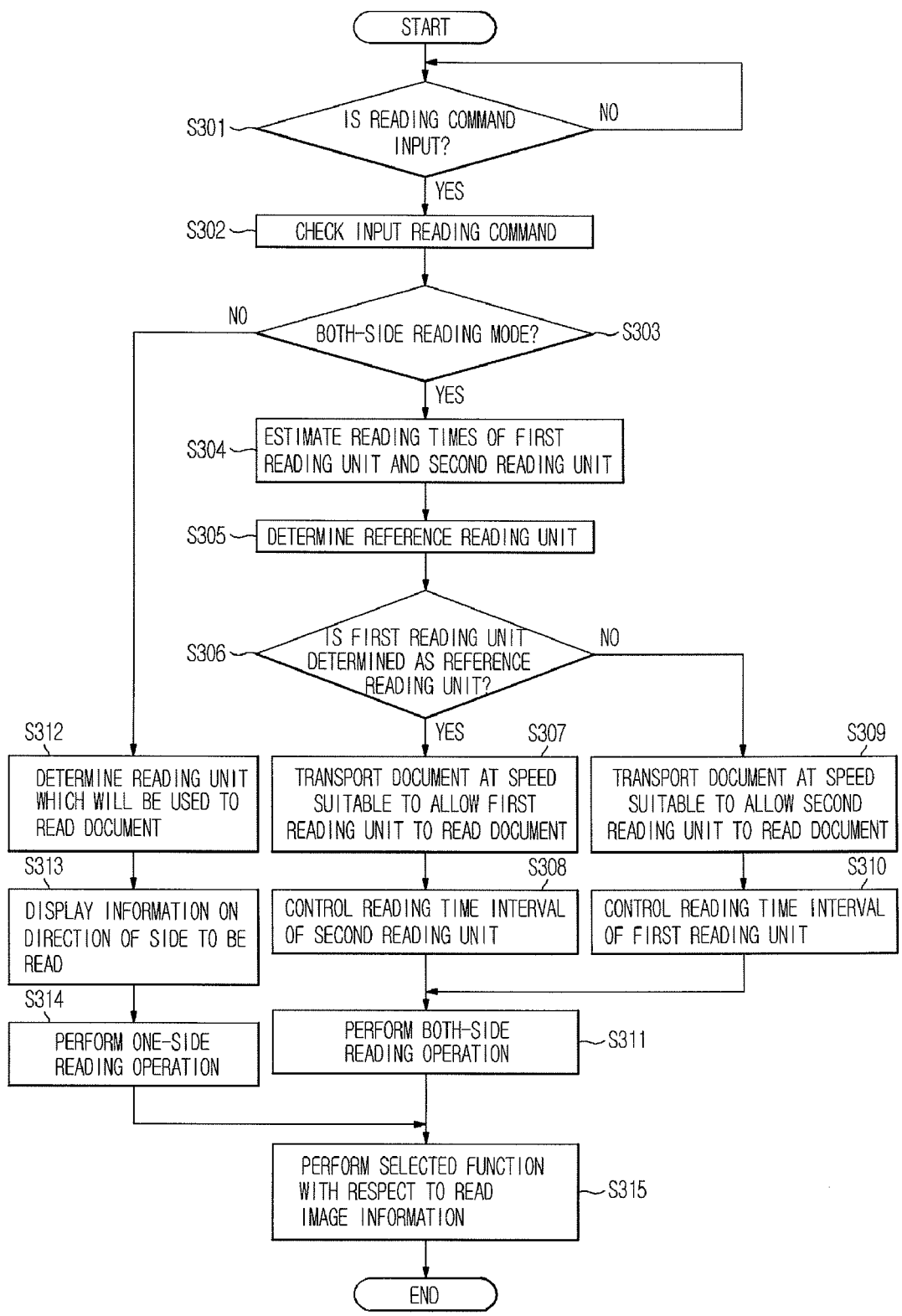
FIG. 4 is a flowchart illustrating a method of controlling the image reading apparatus according to an embodiment of the present general inventive concept.

Hereinafter, a method of controlling the image reading apparatus according to an embodiment of the present general inventive concept will be described with reference to FIGS. 2 to 4. FIG. 4 is a flowchart illustrating a method of controlling the image reading apparatus according to an embodiment of the present general inventive concept.

When a power source of the image reading apparatus is turned on and a determination is made that a document is inserted into the document insertion port 131 via a signal input from the document insertion detection sensor 131b, the control unit 160 determines whether a user inputs a reading command (operation S301). If a determination is made that the reading command is input, the reading command input by the user is checked. At this time, the control unit 160 checks a reading mode selected by the user and a reading option selected by the user (operation S302).

Subsequently, the control unit 160 determines whether the reading mode selected by the user is a both-side reading mode (operation S303).

If a determination is made that the user selects the both-side reading mode, the control unit 160 calculates a time necessary for the first reading unit 140 to read a first side of a document and a time necessary for the second reading unit 150 to read a second side of the document according to the reading option selected by the user (operation S304). Then, the control unit 160 compares the reading time of the first reading unit 140 with the reading time of the second reading unit 150 calculated in Operation S304 and determines any one of the reading units, which has a longer reading time, as a reference reading unit (operation S305).

After the reference reading unit is determined, the control unit 160 determines whether the first reading unit 140 is the reference reading unit (operation S306). If a determination is made that the first reading unit 140 is the reference reading unit, the control unit 160 controls the driving unit 184 such that the document is transported at a speed suitable to allow the first reading unit 140 to read the document (operation S307) and controls the reading time interval of the second reading unit 150 such that the second reading unit 150 does not read the image information of the document more densely than is necessary (operation S308).

Meanwhile, if a determination is made that the second reading unit 150 is the reference reading unit in Operation S306, the control unit 160 controls the driving unit 184 such that the document is transported at a speed suitable to allow the second reading unit 150 to read the document (operation S309) and controls the reading time interval of the first reading unit 140 such that the first reading unit 140 does not read the image information of the document more densely than is necessary (operation S310).

After Operation S308 or S309 is performed, the control unit 160 controls the first reading unit 140 to read the first side of the document and controls the second reading unit 150 to read the second side of the document (operation S311).

Meanwhile, if a determination is made that the user does not select the both-side reading mode in Operation S303, the control unit 160 determined that an one-side reading mode is selected and determines any one of the first reading unit 140 and the second reading unit 150, which will be used to read the document (operation S312). Here, the reading unit, which will be used to read one side of the document, may be determined by a basic setting or selection of the user.

If the reading unit which will be used to read one side of the document is determined, the control unit 160 displays information on the direction of a side of the document, which will be read, that is, information indicating whether a side to be read is directed upward or downward when the document is laid on the document feed tray 131a, to the user (operation S313). More particularly, if the first reading unit 140 is determined as the reading unit which will be used to read one side of the document, the control unit 160 instructs the user to lay the document on the document feed tray 131a in a state in which the document is provided to be suitable to allow the first reading unit 140 to read the document, that is, in a state in which the side to be read is directed upward. In contrast, if the second reading unit 150 is determined as the reading unit which will be used to read one side of the document, the control unit 160 instructs the user to lay the document on the document feed tray 131a in a state in which the document is provided to be suitable to allow the second reading unit 150 to read the document, that is, in a state in which the side to be read is directed downward.

Subsequently, the control unit 160 controls the driving unit 184 to transport the document loaded on the document feed tray 131a at an appropriate speed and, at the same time, controls the first reading unit 140 or the second reading unit 150 to read the first side or the second side of the document (operation S314).

If the reading process of Operation S311 or S314 is completed, the control unit 160 controls the read image information to be stored as a file or to be printed via the printing apparatus 200 according to the selection of the user (operation S315).

The present general inventive concept can also be embodied as computer-readable codes on a computer-readable medium. The computer-readable medium can include a computer-readable recording medium and a computer-readable transmission medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

As described above, according to various embodiments of the present general inventive concept, preventing reading quality from deteriorating is accomplished by controlling a transporting speed of a document such that a first reading unit and a second reading unit sufficiently perform functions thereof when the two reading units respectively read both sides of the document with different capabilities.

Although various embodiments of the present general inventive concept have been illustrated and described, it would be appreciated by those skilled in the art that changes may be made in these embodiments without departing from the principles and spirit of the general inventive concept, the scope of which is defined in the appended claims and their equivalents.

What is claimed is:

1. An image reading apparatus, comprising:
   an automatic document feeder to feed a document;
   a first reading unit to read a first side of the document fed by the automatic document feeder;
   a second reading unit to read a second side of the document fed by the automatic document feeder; and
   a control unit to determine any one of the first reading unit and the second reading unit as a reference reading unit in a both-side reading mode in which both sides of the document are read and control a transport speed of the document such that the document is transported at a speed to allow the reference reading unit to read the document.

2. The image reading apparatus according to claim 1, wherein the control unit estimates a time necessary for the first reading unit to read image information of the document with a time necessary for the second reading unit to read image information of the document and determines at least one of the first and second reading units, which has a longer time, as the reference reading unit.

3. The image reading apparatus according to claim 1, wherein the control unit estimates a time necessary to store image data read by the first reading unit with a time necessary to store image data read by the second reading unit and determines at least one of the first and second reading units, which has a longer time, as the reference reading unit.

4. The image reading apparatus according to claim 1, wherein the control unit compares a reading resolution of the first reading unit with a reading resolution of the second reading unit and determines at least one of the first and second reading units, which has a higher reading resolution, as the reference reading unit.

5. The image reading apparatus according to claim 1, wherein the control unit controls the first reading unit or the second reading unit such that a time interval in which at least one of the first and second reading units, which is not the reference reading unit, reads image information from the document is increased.

6. An image reading apparatus comprising:
   first and second reading units to respectively read a first side and a second side of a document with different capabilities; and
   an automatic document feeder to feed the document at a speed to allow at least one of the first and second reading units, which has a higher reading resolution, to read the document.

7. A method of controlling an image reading apparatus including first and second reading units to respectively read a first side and a second side of a transported document, the method comprising:
   determining at least one of the first reading unit and the second reading unit as a reference reading unit in a both-side reading mode in which both sides of the document are read; and
   controlling a transport speed of the document such that the document is transported at a speed to allow the reference reading unit to read the document.

8. The method according to claim 7, wherein the determining of the reference reading unit comprises:
   estimating a time necessary for the first reading unit to read the document with a time necessary for the second reading unit to read the document according to a reading option selected by a user and determining at least one of the first and second reading units, which has a longer time, as the reference reading unit.

9. The method according to claim 7, wherein the determining of the reference reading unit comprises:
   comparing a reading resolution of the first reading unit with a reading resolution of the second reading unit and determining at least one of the first and second reading units, which has a higher reading resolution, as the reference reading unit.

10. The method according to claim 7, further comprising:
    controlling the first reading unit or the second reading unit such that a time interval in which at least one of the first and second reading units, which is not the reference reading unit, reads image information from the document is increased.

11. A dual sided image reading apparatus having a first reading unit and a second reading unit arranged to read each of both sides of a document simultaneously, comprising:
    an automatic document feeder to feed the document; and
    a control unit to determine a first mode of the first reading unit and a second mode of the second reading unit, the first mode to read the document according to a first speed and the second mode to read the document according to a second speed, to select as a reference reading unit one of the first reading unit and the second reading unit based on which reading unit operates in a mode that reads the document at a lesser speed, and control a transport speed of the document such that the document is transported at a speed to allow the reference reading unit to read the document.

* * * * *